United States Patent Office 2,989,596
Patented June 20, 1961

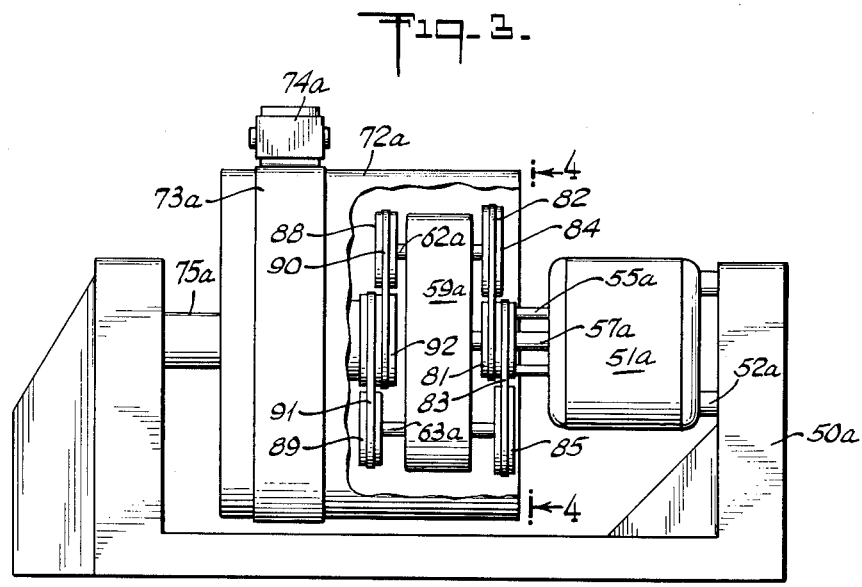
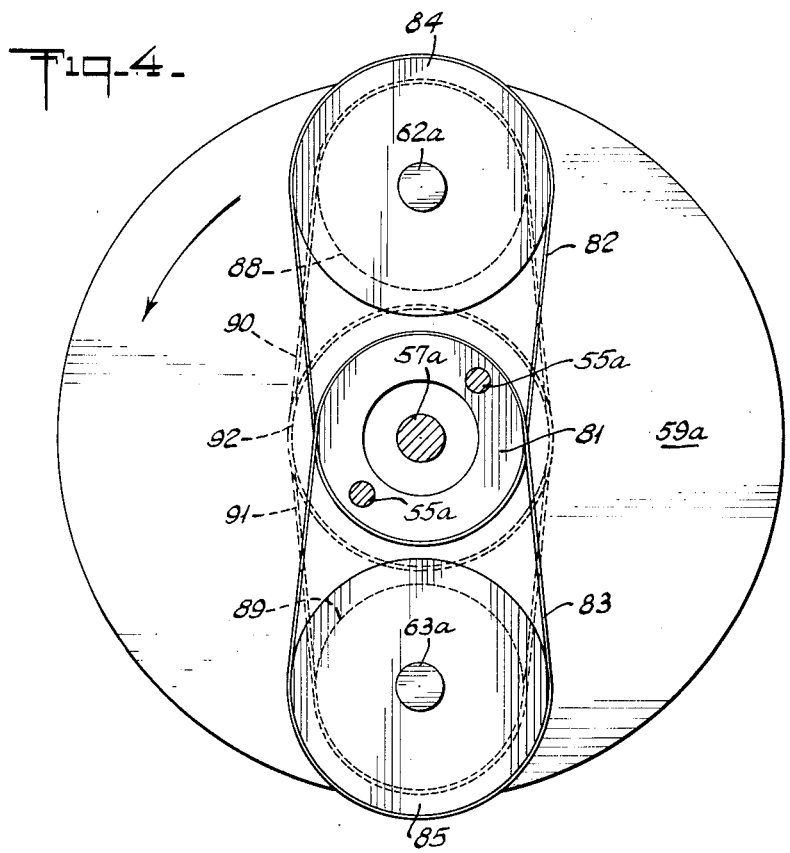

2,989,596
METHOD AND APPARATUS FOR OBTAINING CONSTANT SPEED DRIVE FOR LOW SPEED RECORDERS
Burton D. Lee, Houston, and Alvin L. Parrack, Bellaire, Tex., assignors to Texaco Inc., a corporation of Delaware
Filed Aug. 6, 1957, Ser. No. 676,619
8 Claims. (Cl. 179—100.2)

This invention is concerned with a constant speed drive for low speed equipment of limited size. More specifically, the invention concerns an apparatus and method for obtaining constant speed drive, to be employed in recording systems where a low speed is required while at the same time only limited size apparatus may be employed.

Heretofore, in equipment employed for recording an reproducing seismic information with the use of magnetic tape equipment, some difficulty has been found in attaining a highly constant speed for the drum upon which the magnetic tape is carried. Such highly constant speed is necessary, particularly where the magnetic recording carried out employs frequency modulation. This will be evident when it is noted that, especially in frequency modulated signals, any change in the speed of the recording tape past the magnetic head will cause an effective change in the frequency of the signal being applied to the tape; which change will appear as a false signal upon a playback of the tape.

In addition to the requirement of constant speed, magnetic recording equipment for use in seismic exploration is limited to a relatively low speed of drive for the magnetic tape. The reason for this is that a seismic record will usually require about five seconds duration to complete a single record, and this requires a drum speed of about twelve r.p.m. Flywheels capable of holding the drum speed uniform at such a low angular velocity, would be prohibitively large and consequently cannot be used.

However, it is to be noted that the energy stored in a rotating system that is available to overcome decelerating forces may be expressed by the equation $$W = \frac{Iw^2}{2}$$

Where W is the energy stored, I is the moment of inertia of a rotating body and $w$ is the agnular velocity of the body. Consequently, for a given moment of inertia $I_0$, W is proportional to the square of the angular velocity. Therefore, a tenfold increase of angular velocity will result in a hundredfold increase in energy stored in the system. In spite of this observation, where friction type drives are employed, the low speed drive of the record tape falls considerably short of being constant speed because of slippage and creep that exists with friction type. Furthermore, it has been found that difficulties are encountered in attempting to obtain the necessary constant speed drive with gears or the like, by reason of the fact that a direct gear drive mechanism will introduce a gear tooth flutter which falls within the range of frequency spectrum in which the seismic signals are to be recorded. In order to keep such gear tooth flutter above five hundred cycles per second, (the upper limit of seismic signal frequency range) it would be necessary to employ twenty-five hundred teeth on a five second drum. And, since the circumference of a five second drum is in the neighborhood of thirty-seven and one-half inches, this would result in a tooth spacing of sixty-six and two-thirds teeth per inch, or a tooth interval of fifteen thousandths of an inch, which is entirely impractical. As already indicated, the best prior solution has been to employ friction-type drives for absorbing speed variations. However, at best this type of drive is still not too satisfactory for the reason that there exists slippage and/or creep in such drives.

Consequently, it is an object of this invention to overcome the above indicated difficulties.

Another object of this invention is to provide a method and apparatus for obtaining highly constant speed drive for a low speed recording apparatus having signal frequencies to be recorded in a given range, e.g., from about ten to five hundred cycles per second.

Briefly, this invention concerns a constant speed drive for magnetic recorders and the like, wherein the signals recorded fall within a given range of frequencies. Such drive comprises a constant speed motor, a record medium, and a signal translating head. The drive also comprises means for rotating said record medium relative to said translating head at a low angular velocity. Such means comprises a relatively high velocity inertia element, first positive coupling means for coupling said motor to said inertia element, and second positive coupling means for coupling said inertia element to said record medium. Both said first and second coupling means include means for maintaining the frequencies of the natural fluctuations of the drive system outside of said given signal frequency range.

The invention may also be briefly characterized as being applicable in connection with a magnetic tape recorder for recording seismic signals wherein said signals have a useful range of frequencies from about ten to about five hundred cycles per second, and wherein said magnetic tape has a relative speed past a signal translating head in the range of about seven and one half inches per second. The invention comprises the method of driving said magnetic tape relative to said signal translating head, which includes the steps of positively coupling a relatively high speed motor to drive a high speed inertia element, and positively coupling said inertia element to drive said tape relative to said translating head.

The foregoing and other objects and benefits of the invention will be made clearer by the following more detailed description that is illustrated in the drawings, in which:

FIG. 3 is a side elevation illustrating yet another embodiment of the invention, partly broken away to show some interior details; and FIG. 4 is an enlarged, detail cross section taken along the lines 4—4 of FIG. 3, looking in the direction of the arrows.

Figure 1:
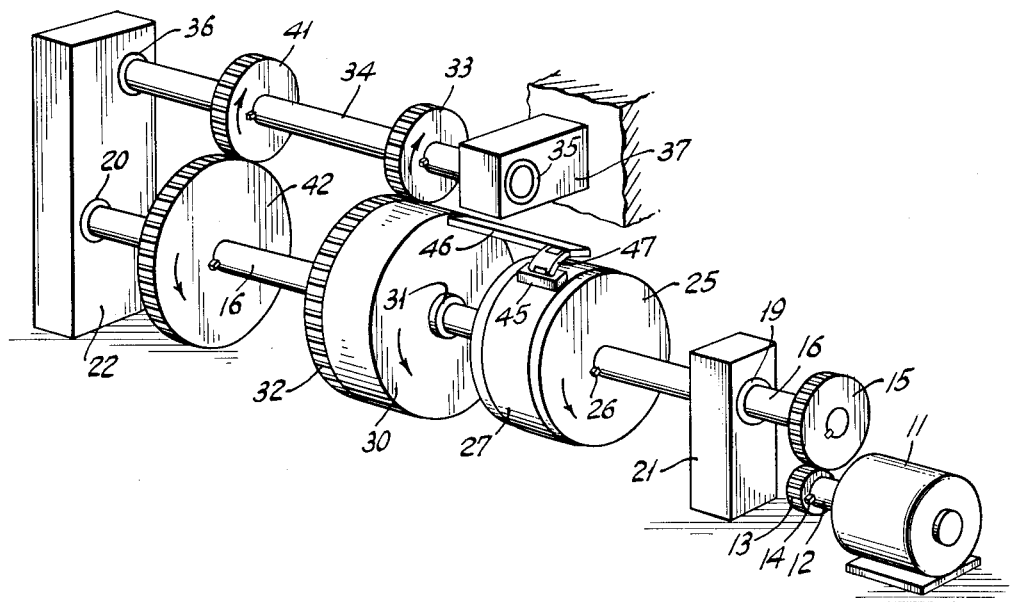
FIG. 1 is a perspective schematic showing of one embodiment of the invention.

Referring first to FIG. 1, there is illustrated an embodiment of the invention wherein a gear drive is employed, but where the speeds of the rotating elements are sufficient to maintain the mechanical fluctuations due to gear tooth flutter at frequencies above the upper range of signal data that is being recorded. The required low relative speed of rotation between the magnetic recording medium and the recording head, which cooperates therewith, is obtained by having the requisite relative speed exist as a difference in speed of rotation of two relatively high speed rotating elements.

More specifically but still referring to Fig. 1; it will be observed that there is a motor 11, which may be any feasible type of motor, or source of rotary power. However, it is preferably a constant speed electric motor, such as a hysteresis type, which may be driven with a constant frequency voltage the frequency of which is controlled by a standard such as a tuning fork or crystal. The motor 11 has a shaft 12, which carries a gear 13, that is securely fastened to the shaft for positive rotation therewith by any feasible means, such as by the use of a key 14 as illustrated. The gear 13 meshes with a gear 15 that is keyed, or otherwise securely fastened to a drive shaft 16. The shaft 16 is supported by a pair of bearings 19 and 20, that are in turn carried by support or framework elements 21 and 22 respectively. Bearings 19 and 20 are illustrated as being sleeve bearings, but of course they may be ball or roller type bearings, if desired.

Also securely fastened on the shaft 16, there is a drum 25 which may be secured for positive rotation with the shaft 16 by a key 26. The drum 25 carries a magnetic tape 27 on the surface thereof which is the recording medium that receives the permanent record of the seismic signals that are applied thereto. The drum 25 will usually be constructed with a relatively heavy circumferential structure in order to provide good inertia effects as the drum is rotated at relatively high r.p.m., e.g., in the neighborhood of six hundred r.p.m.

A second inertia element, or rotor, 30 is supported for free rotation around and relative to the shaft 16, by means of any feasible type bearing such as the sleeve bearing 31 illustrated. The rotor 30 has securely attached thereto, or constructed integrally therewith, a gear 32 that receives driving energy for rotating the inertia rotor 30 from a meshing gear 33. Gear 33 is keyed to a shaft 34, which is supported by bearings 35 and 36, near the extremities thereof. The bearings 35 and 36 are carried by a support 37 and support 22 respectively. These supports are, in turn, part of the framework of the whole mechanism. Also keyed to the shaft 34, there is another gear 41 that meshes with a gear 42, which in turn is keyed or otherwise securely attached to the shaft 16 for rotation therewith.

Carried by the second inertia element, or rotor 30, there is a signal translating head 45. Head 45 is supported adjacent to the exposed surface of the magnetic tape 27, by means of any feasible structure such as an axially extending arm 46 and a circumferentially situated, adjustable support link 47.

OPERATION OF FIGURE 1

The foregoing FIG. 1 embodiment operates in a straightforward manner to produce the required low angular velocity relative speed between the record medium, e.g., magnetic tape 27, and the signal translating head 45. This is accomplished by rotation of the drive shaft 16 by means of the motor 11 via gears 13 and 15 for positive, direct connection therebetween. Shaft 16 rotates the drum 25 therewith at a relatively high speed, e.g., six hundred r.p.m. At the same time, the shaft 16 rotates gear 42, and via the stepdown gears 41, 33 and 32, causes the inertia element rotor 30 to be rotated in the same direction as drum 25, but at a speed of about twelve r.p.m. less than the speed of rotation of the drum 25. Consequently, the translating head 45 is rotated relative to the magnetic tape 27 on drum 25, at the low speed represented by the difference between rotor 30 and drum 25, i.e. twelve r.p.m. This low speed relative drive is gained with the filtering action of inertia elements that are driven at relatively high r.p.m., so that the necessary inertia effects may be had without using prohibitively large inertia elements.

A specific example of the particular design, as to numbers of gear teeth, to be employed in a system according to FIG. 1 where the speed of shaft 16 is six hundred r.p.m. is as follows: gear 42—ninety-eight teeth, gear 32—one hundred teeth and the remaining gears having the required number of teeth to operate properly in conjunction therewith. Thus, the gear tooth flutter frequency on the side of the drum 25 will be ninety-eight times ten (revolutions per second) or nine hundred and eighty cycles per second. On the side of the signal translating head 45, the gear tooth flutter will be one hundred times nine and eight-tenths (revolutions per second—five hundred and eighty-eight r.p.m.) which is again nine hundred and eighty cycles per second. The high inertia of drum 25 and of rotor 30 will act as low pass mechanical filters and thus tend to suppress this flutter quite effectively. Furthermore the frequency of this mechanical fluctuation lies well above the upper frequency limit of the seismic band, which is five hundred cycles per second.

There is a possibility of a low frequency "wow" at both the sum and difference of the individual speeds of drum 25 and rotor 30, i.e., at ten plus nine and eight-tenths and at ten minus nine and eight-tenths (nineteen and eight-tenths, and two-tenths cycles per second, respectively). The severity of this disturbance is controllable by use of precision-cut gears properly mounted and meshed. Furthermore, only the nineteen and eight-tenths cycles would be possibly troublesome and even this is at the extreme low frequency end of the seismic range of signal frequencies.

Figure 2:
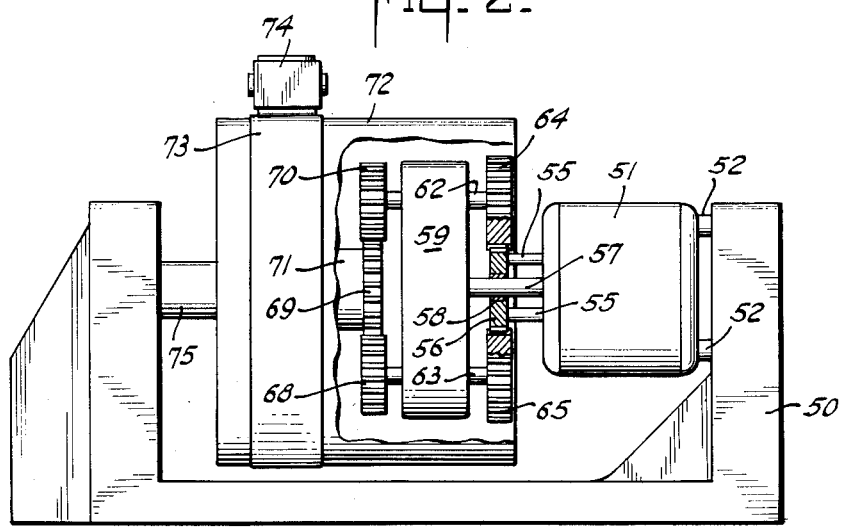
FIG. 2 is a side elevation illustrating another embodiment of the invention, partly broken away and partly in cross section to show more of the details.

Referring to FIG. 2, there is illustrated a different embodiment of the invention wherein the record medium is driven at a low speed and the translating head is held stationary. In this arrangement also, the speeds of the various elements and the choice of the number of gear teeth employed is such that the gear-tooth flutter produced is maintained outside of the given range of signal frequencies. There is a framework element 50 which supports a motor 51 that may be attached to the framework in any convenient manner such as by means of fastening posts 52. Motor 51 is preferably a constant speed type, such as a hysteresis motor that may be driven from a constant frequency source of voltage regulated by a tuning fork or a crystal or the like.

Attached in a fixed manner to the housing, or framework, of the motor 51 by means of attaching posts 55, there is a stationary sun gear 56. Sun gear 56 has a central opening for allowing the passage therethrough of a shaft 57 of the motor 51. If desired, this central opening through the sun gear 56 may contain a bearing 58, as illustrated, to help support the weight of an inertia rotor wheel 59.

Wheel 59 is constructed of relatively heavy material in order to provide an inertia, or flywheel, effect. Near the periphery of wheel 59, there is carried (in a freely rotatable manner) a pair of shafts 62 and 63. Shaft 62 carries firmly attached to one end thereof, for positive rotation therewith, a gear 64 which meshes with the sun gear 56. Similarly, shaft 63 carries at one end thereof a gear 65 securely attached thereto, as by being splined, or having a key, or by reason of a shrink fit, or the like. Gear 65 also meshes with stationary sun gear 56.

On the other end of shaft 63, there is a slightly smaller diameter gear 68, which is also securely attached to the shaft 63 for positive rotation therewith. Gear 68, like gear 65, acts as a planetary gear in cooperation with a sun gear 69 that corresponds to sun gear 56, but that is not fixed like sun gear 56.

Similarly, on the other end of the shaft 62, there is another gear 70 which is securely attached to the shaft 62 for positive rotation therewith, at all times. Gear 70 also meshes with the rotatable sun gear 69.

It is pointed out that the arrangement of planetary and sun gears just described above might be constructed without the dual elements on each side of the central axis of the system, since only one planetary gear would be necessary for cooperating with the sun gears in each case. However, it is preferred to employ a symmetrical, balanced system using the duplication of planetary gears on opposite sides of each sun gear.

The rotatable sun gear 69 is securely attached to or carried by a central hub 71, which in turn is carried by a hollow drum 72, in any convenient manner, such as by being cast integrally therewith. On the outer surface of hollow, or cup-shaped, drum 72 there is a magnetic tape 73 which acts cooperatively with a translating head 74, for receiving the signals to be recorded. Drum 72 is supported for free rotation by means of any feasible bearing structure (not shown), that is in turn supported by a central hub, or post 75. The supporting hub 75 is carried by the framework 50.

OPERATION OF FIGURE 2

In operation, the FIG. 2 arrangement drives the magnetic tape 73 past the translating head 74 at a low speed (as required) in order to make a five-second record in one revolution of the drum 72, which carries the magnetic tape 73. This is accomplished while maintaining highly constant speed, by driving the inertia rotor element 59 directly with the shaft 57 of the motor 51. This then causes the planetary gears 64 and 65 to both rotate and translate, or "walk," around the stationary sun gear 56. At the same time, planetary gears 70 and 68 are being bodily translated around the sun gear 69 with which they are in meshing relation. The rotation of these planetary gears 70 and 68 about their own axes, in each case is determined by the rotation of the corresponding planetary gears 64 and 65 respectively, which are secured firmly to the corresponding shafts 62 and 63 for rotation therewith. By providing the sun gear 56 with a few teeth less than either of the planetary gears 64 or 65, the planetary gears will not complete an even number of full revolutions with each revolution of the rotor 59. Consequently, the attached gears 70 and 68 will correspondingly not be rotated for complete revolutions with each revolution of the rotor 59. Therefore, there will be a rotation of the rotary sun gear 69 caused about its axis. This rotation is very much less than the rotations of rotor 59, and is determined by the ratio of the number of teeth advanced on the rotary sun gear 69, to the number of teeth which this same rotary sun gear 69 has. Since planetary gearing as such, is well known, no more detailed description of this action is necessary. By properly designing the numbers of teeth involved in the planetary gear reduction system, the speed of rotation of the drum 72 and the magnetic tape 73 carried thereon may be made a desirably low r.p.m., e.g., twelve r.p.m.

The following figures are provided as a specific example for obtaining twelve r.p.m. of the drum 72: the sun gear 56 and each of the planetary gears 68 and 70 may have one hundred and sixty-five teeth. Rotatable sun gear 69 and planetary gears 64 and 65, would then be contructed with one hundred and sixty-seven teeth each. Consequently, for each complete revolution of the inertia rotor 59, the rotary sun gear 69 will be advanced four teeth. Now, for a motor speed of the motor 51 of five hundred r.p.m., the drum 72 (along with sun gear 69) will have a speed of twelve r.p.m. This may be determined by the equation $$\frac{X \text{ r.p.m.}}{500 \text{ r.p.m.}} = \frac{4}{167}$$

$X=12$ r.p.m. (11.976 . . .). At the same time, it will be noted that the meshing rate of gear teeth will be one thousand three hundred and seventy-five teeth per second, so that this falls well above the range of signal frequencies to be employed. In addition, the fundamental vibration of the motor running at five hundred r.p.m. will be eight and one third fluctuations per second and this falls well below the seismic range of signal frequencies.

Referring to the FIGS. 3 and 4, it will be noted that the structure is substantially similar to that of the FIG. 2 arrangement. The difference lies in the use of a different type of driving connection, as compared to the gears employed in FIG. 2. In view of the similarities of these two arrangements, the elements which are substantially unchanged will be given the same reference numbers as those employed in FIG. 2, but with a "sub a" designation.

Referring to the elements which are different in the FIGS. 3 and 4 embodiment, it will be noted that there is a stationary sun element 81, which corresponds to the stationary sun gear 56 of the FIG. 2 arrangement. Wrapped around the peripheral surface of the stationary sun element 81, there is a pair of thin steel belts 82 and 83. Each of the belts 82 and 83 is also wrapped over the peripheral surface of a planetary wheel 84 and 85, respectively.

The belts 82 and 83 are constructed of thin steel or similar material, which is substantially unstretchable but which is applied around the surfaces of planetary wheels 84, 85 and stationary sun wheel 81, under sufficient tension to insure that no slippage will take place between any of these wheels and the belt in contact therewith.

On the other end of the shaft 62a and 63a, there are corresponding planetary wheels 88 and 89. All of these planetary wheels, i.e., 84, 85, 88 and 89 are securely attached to the respective shafts for positive rotation therewith. Cooperating with the planetary wheels 88 and 89, there are additional unstretchable belts 90 and 91 respectively. Each is wrapped around an adjacent portion of the peripheral surface of a rotary sun wheel 92.

It will be clear to anyone skilled in the art, that the operation of the FIGS. 3 and 4 embodiment is basically similar to that of the FIG. 2 apparatus, so that no detailed explanation of the operation is necessary. In this case, however, the design of the dimensions is a matter of proportioning the effective diameters of the various pulley, or wheel, surfaces that are contacted by the unstrechable belts which act to cause the relative rotations of the various wheels in the planetary system.

In this embodiment, the tensioned belts provide an operation which is in effect comparable to a gear system with an infinite number of teeth. Consequently, the operation is smoother than that obtainable with gears while at the same time, none of the detrimental effects exist which are to be found with ordinary friction-type drive arrangements. In this regard, it is to be noted that the belts employed are preferably a relatively light gauge steel in thin strips, with the ends of each belt being butt welded to provide a smooth endless type of structure.

While certain embodiments of the invention have been described in considerable detail in accordance with the applicable statutes, this is not to be taken as in any way limiting the invention, but merely as being descriptive thereof.

It is claimed:

1. A constant speed drive for magnetic recorders and the like wherein the signals recorded fall within a given range of frequencies, comprising a constant speed motor, a record medium, a signal translating head, means for rotating said record medium relative to said translating head at an angular velocity of less than twenty revolutions per minute comprising a relatively high angular velocity inertia element directly driven by said motor, and positive coupling means connecting said inertia element with said record medium for driving said record medium relative to said translating head, said last named means including means for maintaining natural mechanical fluctuation frequencies outside said range.

2. A constant speed drive for magnetic recorders and the like wherein the signals recorded fall within a given range of frequencies, comprising a constant speed motor, a record medium, a signal translating head, means for rotating said record medium relative to said translating head at an angular velocity of less than twenty revolutions per minute comprising a relatively high angular velocity inertia element directly driven by said motor, and planetary positive coupling means connecting said inertia element with said record medium for driving said record medium relative to said translating head, said planetary coupling means having the mechanical elements thereof arranged and proportioned so that the natural periods of fluctuation substantially all lie outside said range of frequencies.

3. A constant speed drive for magnetic recorders and the like wherein the signals recorded fall within a given range of frequencies, comprising a constant speed motor, a record medium, a signal translating head, planetary means for rotating said record medium relative to said translating head comprising a stationary sun member, a high velocity inertia rotor driven by said motor and coaxial with said sun member, a first planetary rotor element carried by said inertia rotor and positively connected to said sun member for rotation there-around, a second planetary rotor element directly connected to said first planetary rotor element for rotation therewith, a rotary sun member coaxial with said stationary sun member and positively connected to said second planetary rotor element, the effective diameters of said sun members and planetary elements being such that said rotary sun member is rotated at a predetermined low velocity, and means for rotating said record medium with said rotary sun member for recording at a constant low velocity.

4. The invention according to claim 3 wherein said sun members are connected to said planetary elements by means of gear teeth, the number of said teeth employed being such that the natural period of gear tooth flutter lies outside said given range of frequencies.

5. The invention according to claim 3 wherein said sun members are connected to said planetary elements by means of flexible substantially unstretchable belts under tension sufficient to avoid any slippage.

6. A constant speed drive for magnetic recorders and the like wherein the signals recorded fall within a given range of frequencies, comprising a constant speed motor, a record medium, a hollow drum for supporting said record medium around the exterior surface thereof, a signal translating head for cooperating with said record medium, planetary means for rotating said record medium relative to said translating head comprising a stationary sun member, a high velocity inertia rotor driven by said motor and coaxial with said sun member, a first planetary rotor element carried by said inertia rotor and positively connected to said sun member for rotation therearound, a second planetary rotor element directly connected to said first planetary rotor element for rotation therewith, a rotary sun member coaxial with said stationary sun member and positively connected to said second planetary rotor element, the effective diameters of said sun members and planetary elements being such that said rotary sun member is rotated at a predetermined low velocity, said sun members and said planetary elements as well as said inertia rotor all being located inside said hollow drum with said sun members coaxial therewith, and said rotary sun member being attached to said hollow drum for rotation therewith in order to provide desired constant low speed drive for magnetic recording in seismic work and the like.

7. A constant speed drive for magnetic recorders and the like wherein the signals recorded fall within a given range of frequencies, comprising a constant speed motor, a record medium, a signal translating head, means for rotating said record medium relative to said translating head at an angular velocity of less than twenty revolutions per minute comprising a relatively high angular velocity inertia element directly driven by said motor, another relatively high angular velocity inertia element driven positively from said motor with a reduction such that the difference in velocities between said two inertia elements is equal to said relative angular velocity, said record medium being carried by one of said inertia elements and said translating head being carried by the other inertia element, said drives being so arranged that substantially all natural mechanical fluctuations will lie outside said given range of signal frequencies.

8. A constant speed drive for magnetic recorders and the like wherein the signals recorded fall within a given range of frequencies, comprising a constant speed motor, a record medium, a signal translating head, means for rotating said record medium relative to said translating head at an angular velocity of less than twenty revolutions per minute comprising a relatively high angular velocity inertia element directly driven by said motor, said inertia element carrying said record medium thereon, another relatively high angular velocity inertia element driven positively from said motor with a reduction such that the difference in velocities between said two inertia elements is equal to said relative angular velocity, said other inertia element carrying said translating head and being located coaxially with said first named inertia element for cooperatively situating said head and said record medium, said drives consisting of gears employing a sufficient number of teeth so that substantially all mechanical fluctuations will lie outside said given range of signal frequencies.

References Cited in the file of this patent

UNITED STATES PATENTS

| | | |
|---|---|---|
| 845,103 | Ljungstrom | Feb. 26, 1907 |
| 1,767,916 | Coleman | June 24, 1930 |
| 2,218,838 | Alspaugh | Oct. 22, 1940 |
| 2,278,680 | Thompson | Apr. 7, 1942 |
| 2,401,356 | Keinath et al. | June 4, 1946 |
| 2,462,435 | Stanton | Feb. 22, 1949 |
| 2,613,125 | Brown | Oct. 7, 1952 |
| 2,773,120 | Masterson | Dec. 4, 1956 |
| 2,782,626 | Jochum et al. | Feb. 26, 1957 |
| 2,859,429 | Coombs | Nov. 4, 1958 |

FOREIGN PATENTS

| | | |
|---|---|---|
| 348,633 | Great Britain | May 11, 1931 |